(12) United States Patent
Piercy et al.

(10) Patent No.: US 8,335,306 B1
(45) Date of Patent: Dec. 18, 2012

(54) CUSTOMER CONTROLLED HOTLINE

(75) Inventors: Larry H. Piercy, St. Joseph, MO (US);
Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1842 days.

(21) Appl. No.: 11/538,161

(22) Filed: Oct. 3, 2006

(51) Int. Cl.
  *H04M 3/42* (2006.01)
  *H04L 12/66* (2006.01)
  *H04L 12/28* (2006.01)

(52) U.S. Cl. ............... 379/216.01; 370/352; 370/401

(58) Field of Classification Search ............ 348/14.08, 348/14.13, 14.02; 379/45, 46, 47, 211.02, 379/38, 39, 40, 216.01, 42, 43, 44, 49, 51, 379/211; 370/352, 353, 354, 355, 356, 357; 455/417, 414, 418, 433, 404.1, 406, 407, 455/410, 419, 460, 461, 459, 556
See application file for complete search history.

(56) References Cited

U.S. PATENT DOCUMENTS

| | | | | |
|---|---|---|---|---|
| 5,329,578 | A * | 7/1994 | Brennan et al. | 379/211.03 |
| 5,729,599 | A * | 3/1998 | Plomondon et al. | 379/211.02 |
| 6,690,675 | B1 * | 2/2004 | Kung et al. | 370/401 |
| 7,408,925 | B1 * | 8/2008 | Boyle et al. | 370/352 |
| 7,647,047 | B2 * | 1/2010 | Moghaddam et al. | 455/434 |
| 2002/0080751 | A1 * | 6/2002 | Hartmaier | 370/338 |
| 2002/0193100 | A1 * | 12/2002 | Riffe et al. | 455/417 |
| 2004/0083195 | A1 * | 4/2004 | McCord et al. | 706/47 |
| 2004/0179092 | A1 * | 9/2004 | LaPoint | 348/14.08 |
| 2004/0203589 | A1 * | 10/2004 | Wang et al. | 455/410 |
| 2005/0053220 | A1 * | 3/2005 | Helbling et al. | 379/211.02 |
| 2005/0058269 | A1 * | 3/2005 | Watts et al. | 379/211.02 |
| 2005/0063528 | A1 * | 3/2005 | Pearson et al. | 379/211.01 |
| 2005/0130611 | A1 * | 6/2005 | Lu et al. | 455/130 |
| 2005/0180395 | A1 * | 8/2005 | Moore et al. | 370/352 |
| 2005/0190750 | A1 * | 9/2005 | Kafka et al. | 370/352 |
| 2005/0207557 | A1 * | 9/2005 | Dolan et al. | 379/210.02 |
| 2005/0213740 | A1 * | 9/2005 | Williams et al. | 379/211.02 |
| 2005/0238142 | A1 * | 10/2005 | Winegarden | 379/45 |
| 2006/0072726 | A1 * | 4/2006 | Klein et al. | 379/201.01 |
| 2006/0133582 | A1 * | 6/2006 | McCulloch | 379/45 |
| 2007/0206571 | A1 * | 9/2007 | Silver | 370/352 |
| 2008/0096539 | A1 * | 4/2008 | Moghaddam et al. | 455/418 |
| 2009/0141882 | A1 * | 6/2009 | Baeza | 379/211.02 |
| 2010/0158235 | A1 * | 6/2010 | Frederick | 379/216.01 |

* cited by examiner

*Primary Examiner* — Ahmad Matar
*Assistant Examiner* — Kharye Pope

(57) ABSTRACT

A call processing system for handling calls in a communication network operated by a communication carrier comprising and interface and a processing system. The interface is configured to receive a hotline instruction from a customer of the communication carrier to enable a plurality of hotline features for a plurality of devices associated with the customer to route a plurality of calls from the plurality of devices to a plurality of hotline destinations, and receiving a first call request for a first call to a first intended destination from a first device of the plurality of devices. The processing system is configured to process the first call request to determine if a first hotline feature for the first device is enabled, and process the first call request to route the first call to a first hotline destination of the plurality of hotline destinations if the first hotline feature is enabled.

19 Claims, 5 Drawing Sheets

CUSTOMER CONTROLLED HOTLINE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of telecommunications, and in particular, to customer controlled hotlines.

2. Description of the Prior Art

Telecommunication customers frequently wish to establish communications with other people in an urgent manner. For example, a party that has sustained an injury as the result of an accident may wish to reach a spouse or other close family member as soon as possible. In another example, a parent may wish for a child to contact the parent at the earliest possible moment. In yet another example, an employer may want an employee to contact the employer without delay.

In a modern communications environment, many solutions exist in the prior art for notifying a party that another party desires urgent communications with the party. In an example of the prior art, a page, text message, or email message could be sent or a voicemail recorded alerting a party to a request for urgent communications.

Unfortunately, under many circumstances one party may be unresponsive to the other party that desires urgent communications. For instance, one party may neglect to check a message inbox or may otherwise be unaware of the urgent nature of the requested communication. As a result, the requested urgent communication goes unheeded.

SUMMARY OF THE INVENTION

An embodiment of the invention advances the art by providing systems, networks, methods, and software that allow a customer to provide hotline instructions that when applied to a call causes the call to be routed to a hotline destination, rather than the intended destination of the call. In an advantage, a party that wishes to communicate with another party in an urgent manner can provide a hotline instruction that causes a call by the other party to be routed according to the hotline instruction.

In an embodiment of the invention, a method of operating a call processing system to handle calls in a communication network operated by a communication carrier comprises receiving a hotline instruction from a customer of the communication carrier to enable a plurality of hotline features for a plurality of devices associated with the customer to route a plurality of calls from the plurality of devices to a plurality of hotline destinations, receiving a first call request for a first call to a first intended destination from a first device of the plurality of devices, processing the first call request to determine if a first hotline feature for the first device is enabled, and processing the first call request to route the first call to a first hotline destination of the plurality of hotline destinations if the first hotline feature is enabled.

In an embodiment of the invention, the method comprises processing the first call request to route the first call to the first intended destination if the first hotline feature is not enabled.

In an embodiment of the invention, the method comprises receiving a second call request for a second call to a second intended destination from a second device of the plurality of devices, processing the second call request to determine if a second hotline feature for the second device is enabled, and processing the second call request to route the second call to the first hotline destination if the second hotline feature is enabled.

In an embodiment of the invention, the hotline instruction comprises a single hotline instruction and wherein the single hotline instruction enables the first hotline feature and the second hotline feature.

In an embodiment of the invention, the hotline instruction indicates a phone number for the first hotline destination.

In an embodiment of the invention, the hotline instruction enables the plurality of hotline features for a number of calls.

In an embodiment of the invention, the hotline instruction enables the plurality of hotline features for a time of day.

In an embodiment of the invention, the method comprises disabling the plurality of hotline features after receiving at least one call from each of the plurality of devices.

In an embodiment of the invention, the first device comprises a first mobile phone.

In an embodiment of the invention, the first hotline destination comprises a second mobile phone.

In an embodiment of the invention, a call processing system for handling calls in a communication network operated by a communication carrier comprises an interface configured to receive a hotline instruction from a customer of the communication carrier to enable a plurality of hotline features for a plurality of devices associated with the customer to route a plurality of calls from the plurality of devices to a plurality of hotline destinations, and receiving a first call request for a first call to a first intended destination from a first device of the plurality of devices. The call processing system further comprises a processing system configured to process the first call request to determine if a first hotline feature for the first device is enabled, and process the first call request to route the first call to a first hotline destination of the plurality of hotline destinations if the first hotline feature is enabled.

In an embodiment of the invention, a communication network operated by a communication carrier comprises an interface system configured to receive a hotline instruction from a customer of the communication carrier to enable a plurality of hotline features for a plurality of devices associated with the customer to route a plurality of calls from the plurality of devices to a plurality of hotline destinations, and transfer the hotline instruction. The communication network further comprises a call processing system coupled to the interface system and configured to receive the hotline instruction, receiving a first call request for a first call to a first intended destination from a first device of the plurality of devices, process the first call request to determine if a first hotline feature for the first device is enabled, and process the first call request to route the first call to a first hotline destination of the plurality of hotline destinations if the first hotline feature is enabled.

BRIEF DESCRIPTION OF THE DRAWINGS

The same reference number represents the same element on all drawings.

DETAILED DESCRIPTION OF THE PREFERRED EMBODIMENT

FIGS. 1-5 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
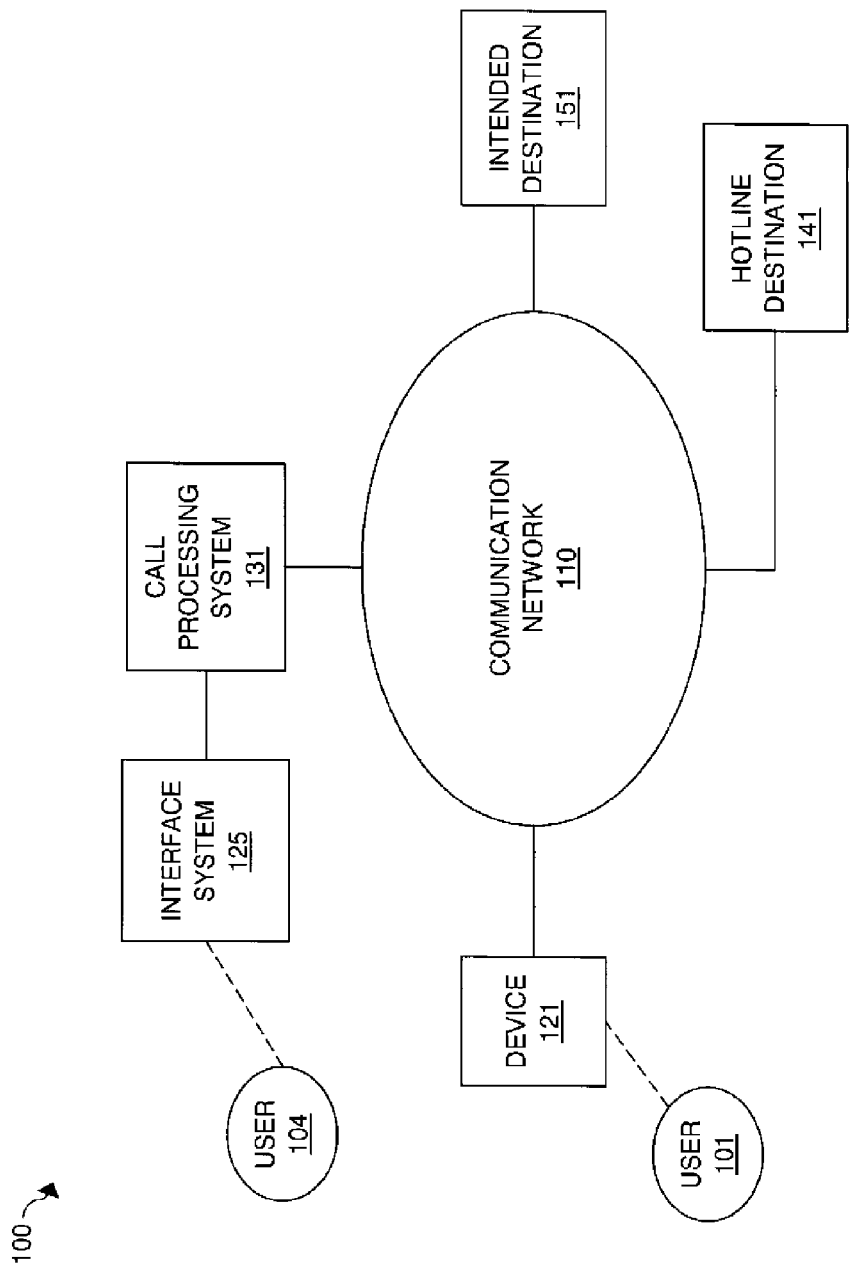
FIG. 1 illustrates a communication network in an embodiment of the invention.

FIG. 1 illustrates communication network 100 in an embodiment of the invention. Communication network 100 advantageously allows a customer to provide hotline instructions that, when applied to a call, causes the call to be routed to a hotline destination, rather than the intended destination of the call. In an advantage, a party that wishes to communicate with another party in an urgent manner can provide a hotline instruction that causes a call by the other party to be routed according to the hotline instruction.

Communication network 100 includes communication network 110, device 121, call processing system (CPS) 131, intended destination 151, and hotline destination 141. Device 121 could be operatively coupled to and/or in communication with CPS 131 over communication network 110. Likewise, device 121 could be operatively coupled to and/or in communication with intended destination 151 or hotline destination 141 over communication network 110.

Communication network 110 could be any network or collection of networks capable of operatively linking device 121, CPS 131, intended destination 151 and 141. Either all or a portion of communication network 110 could be owned or operated by a communications carrier, a virtual communications carrier, or the like. Customers could subscribe to or purchase communications services provided by the carrier, such as voice, video, or data services. Customers could be individuals, corporations, governments, or universities, as well as other types of entities that enter into a relationship with the carrier to obtain services provided by the carrier.

Device 121 could be any communication device capable of placing calls to communication network 110. For example, device 121 could be a mobile phone, a personal computer, a pager, or a personal digital assistant, as well as any other type of communication device or collection of communication devices. Intended destination 151 could be any network, system, or device capable or terminating or receiving calls from communication network 110. Similarly, hotline destination 141 could be any network, system, or device capable of terminating or otherwise receiving calls from communication network 110.

Call processing system 131 could be any system or collection of systems capable of processing call requests and/or otherwise providing call control for calls placed to or from device 121. Call processing system 131 could be any system or collection of systems capable of communicating with device 121 to setup calls from device 121 to communication network 110 and/or destinations 141 and 151. Call processing system 131 could be, for example, a mobile switching center (MSC), a soft-switch, or a media gateway controller, as well as other types of call control or call processing systems. Call processing system 131 could be owned or operated by a communications carrier, such as the same communications carrier or virtual carrier associated with all or a portion of communication network 110. Call processing systems, such as soft switches, media gateway controllers, circuit switches, and mobile switching centers, are generally well known in the art.

Call processing system 131 could include an interface, a processing system, a storage system, and software. The storage system could store software. The processing system could be linked to the interface. Call processing system 131 could be comprised of a programmed general-purpose computer, although those skilled in the art will appreciate that programmable or special purpose circuitry and equipment may be used. Call processing system 131 may use a client server architecture where operations are distributed among a server system and client devices that together comprise call processing system 131.

The interface could comprise a network interface card, modem, port, or some other communication device. The interface may be distributed among multiple communication devices. The interface could comprise a computer microprocessor, logic circuit, or some other processing device.

The processing system may be distributed among multiple processing devices. The storage system could comprise a disk, tape, integrated circuit, server, or some other memory device.

The storage system may be distributed among multiple memory devices. The processing system retrieves and executes the software from the storage system.

The software may comprise an operating system, utilities, drivers, networking software, and other software typically loaded onto a general-purpose computer. The software could also comprise an application program, firmware, or some other form of machine-readable processing instructions. When executed by the processing system, the software directs processing system to operate as described for call processing system 131.

In operation, callers using devices, such as device 121, place calls to communication network 110. Call processing system 131 exchanges call signaling or control messages with the devices during the call process to initiate, setup, and teardown the calls. To initiate a call, a device typically transmits a call request message to call processing system 131. The call request message often times identifies the caller, such as by a device identifier or the like, and the called party, such as by a destination telephone number or other such called party identification. Call processing system 131 processes the call request message to determine call handling instructions or procedures for the call to route the call to the called party.

Call processing system 131 often times communicates with other call processing elements within communication network 110 to establish a call over communication network 110 to a destination. Call processing system 131 typically processes call requests using call processing tables stored in call processing databases to determine the call handling instructions or procedures for the calls. Call processing tables and databases, such as pre-translations, translations, and routing tables and/or databases are well known in the art.

In a call processing example, device 121 could transmit a call request to call processing system 131 for a call to intended destination 151. Intended destination 151 could be identified in the call request by a telephone number, a network address, a destination alias, or the like. Similarly, the calling party or device 121 itself could be identified in the call request, such as be a device identifier, a caller identifier, a network address, an alias, or the like.

In this example, call processing system 131 could receive and process the call request using call processing tables. In a first step, call processing system 131 could process the identity of the caller or calling device, device 121, to determine a customer profile associated with the caller or calling device by performing a look-up to a profile table using either the caller or device identity. Call processing system 131 could then retrieve the customer profile and apply settings or rules stored in the customer profile to the call request. In an example, customer profiles often times include well known limitations on what types of calls are allowed by a particular caller or device.

After determining that the call to intended destination 151 is allowed, call processing system 131 determines call handling or routing instructions for the call. In one example, call processing system performs a look-up to a call routing table to determine routing instructions for the call. Call processing system 131 could then return the call handling or routing instructions to device 121 and/or to elements within communication network 110 to continuing setting up the call between device 121 and intended destination 151.

It should be understood that additional call processing steps could be performed. It should be further understood that well known and widely understood variations of the call processing illustrated herein are possible.

In an advance, a communications carrier could provide an interface system 125 between a customer of the communication carrier and call processing system 131. The interface system 125 could provide the customer with the ability to modify the call processing steps executed by call processing system 131 when processing call request from callers or devices associated with the customer.

In particular, a communications carrier could provide customers of the carrier with the ability to hotline calls placed by callers or devices associated the customers. In an example, calls placed to an intended destination would instead be routed to a hotline destination specified by the customers. The carrier could provide the customers with interface system 125 to transfer or input hotline instructions from the customers to call processing system 131. Interface system 125 could be a system or collection of systems that collect or otherwise received hotline instructions from the customers and transfer the hotline instructions in an appropriate manner to call processing system 131 for use in call processing.

It should be understood that the hotline instructions provided by carrier customers to call processing system 131 could be received and integrated into existing or new call processing tables. In one example, a processing table could store the identity of callers or devices in association with an entry or identifier that indicates whether or not a hotline instruction is enabled for that particular caller of calling device. Furthermore, the table could point to another entry in the same or another table identifying the hotline destination. The hotline destination could be identified by a telephone number, a network address, an alias, or the like. Other variations are possible.

In the event of a call from a device to an intended destination wherein a hotline instruction is enabled for the device or the caller, call processing system 131 would process the call to route the call to the hotline destination, rather than the intended destination. Presumably, the hotline destination could be a different destination than the intended destination. The hotline destination could be another device, such as a network, system, device, or any combination thereof, such as a mobile telephone, a landline telephone, an answering service, a messaging service, a personal computer, a personal digital assistant, a service platform, or the like.

Figure 2:
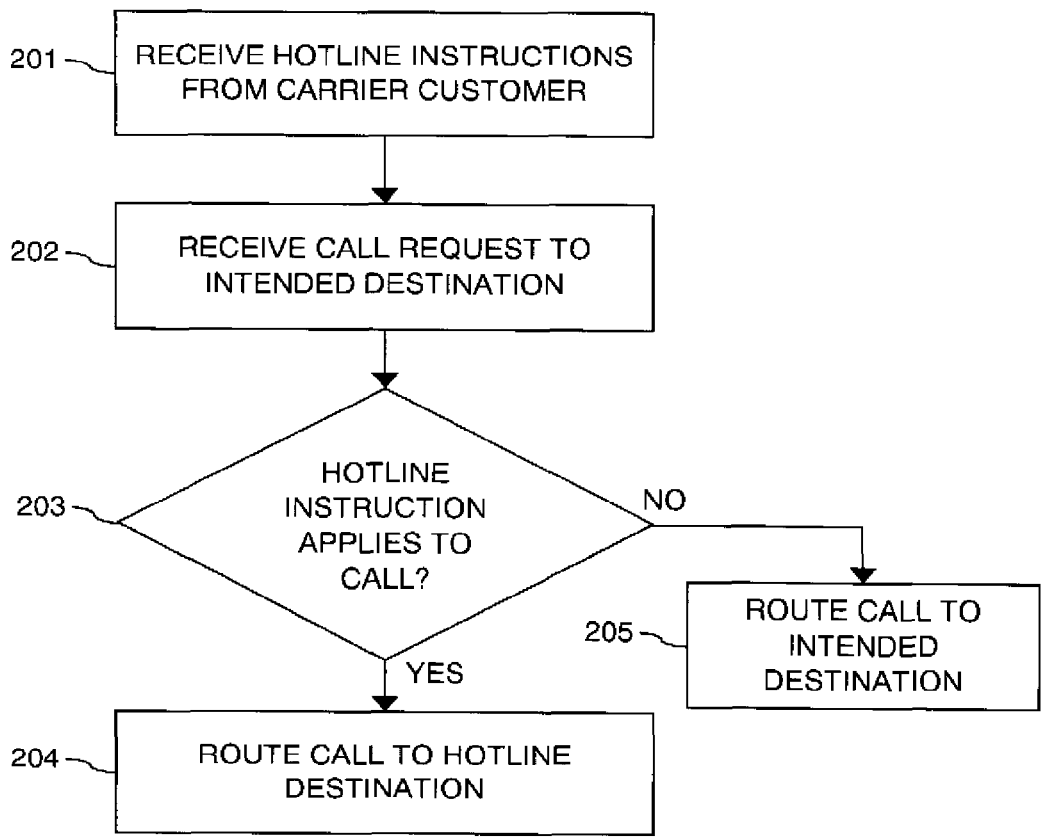
FIG. 2 illustrates the operation of a call processing system in an embodiment of the invention.

FIG. 2 illustrates the operation of call processing system 131 in an embodiment of the invention. To begin, call processing system 131 receives hotline instructions from a user or customer 104 of a communications carrier that owns operates, in an actual or virtual manner, all or part of a communication network, such as communication network 110 (Step 201). The customer 104 could enable via the hotline instructions hotline features for a device, a caller, a group of devices, or a group of callers associated with the customer. Call processing system 131 responsively receives and stores the hotline instructions for later application within a call process. The hotline instructions could direct call processing system 131 to route calls by callers or devices associated with the customer to hotline destination 141.

At any point, call processing system 131 receives a call request from device 121 for a call placed by user 101 to intended destination 151 (Step 202). Call processing system 131 processes the call request to first determine whether or not a hotline instruction applies to the call (Step 203). For example, call processing system 131 could perform a look-up to a table based on the identity of device 121 or the caller placing the call using device 121 to determine whether or not a hotline feature for the caller or device 121 is enabled. The hotline feature could have been enabled by the hotline instructions earlier provided by the customer 104 to call processing system 131 in Step 201.

In a situation whereby the hotline instruction applies to the call and the hotline feature is enabled, call processing system 131 processes the call request to route the call to hotline destination 141 (Step 204). In a situation whereby the hotline instruction does not apply to the call, call processing system 131 processes the call request to route the call to intended destination 151.

Figure 3:
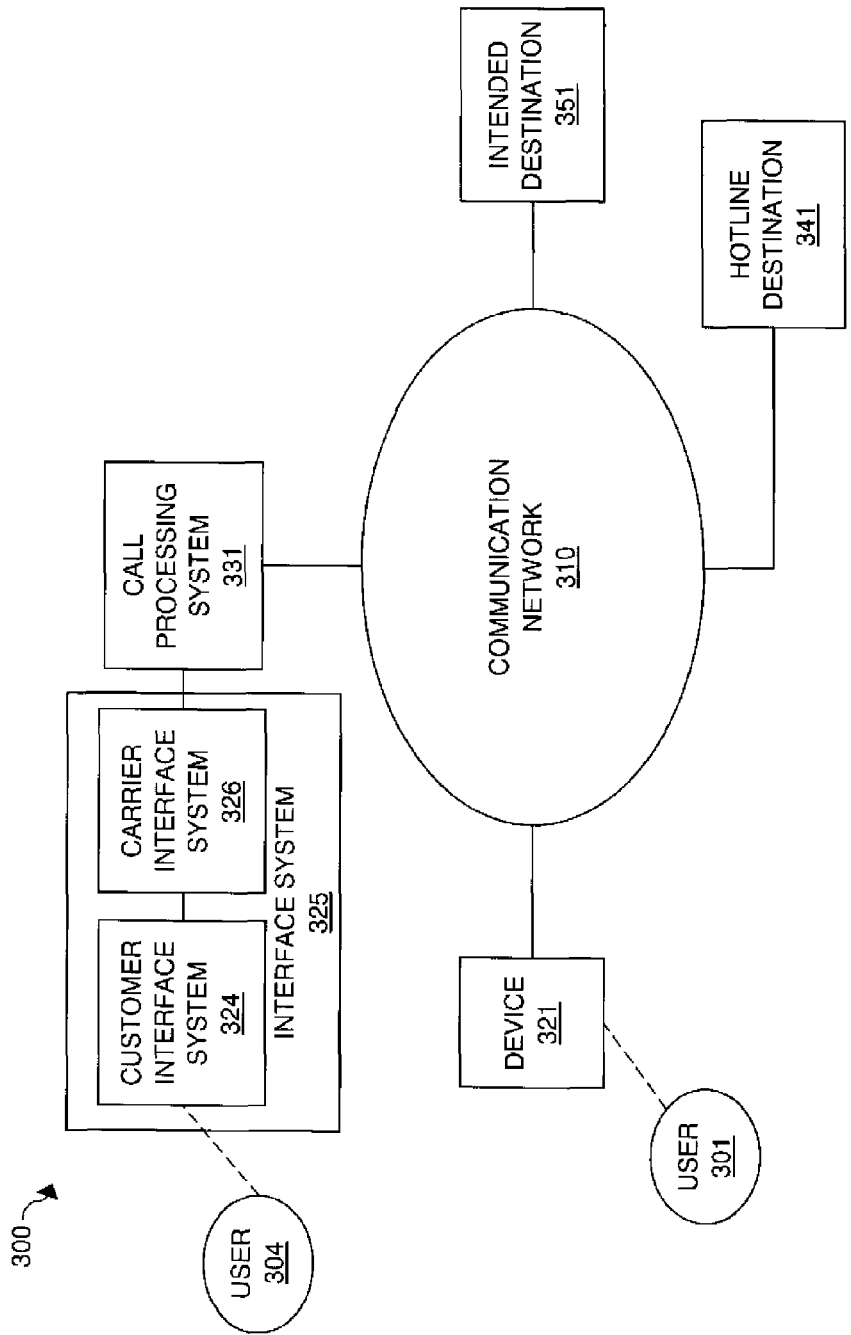
FIG. 3 illustrates a communication network in an embodiment of the invention.

FIG. 3 illustrates communication network 100 in an embodiment of the invention. Communication network 300 advantageously allows a customer to provide hotline instructions that, when applied to a call, causes the call to be routed to a hotline destination, rather than the intended destination of the call. In an advantage, a party that wishes to communicate with another party in an urgent manner can provide a hotline instruction that causes a call by the other party to be routed according to the hotline instruction.

Communication network 300 includes communication network 310, device 321, call processing system (CPS) 331, intended destination 351, and hotline destination 341. Device 321 could be operatively coupled to and/or in communication with CPS 331 over communication network 310. Likewise, device 321 could be operatively coupled to and/or in communication with intended destination 351 or hotline destination 341 over communication network 310.

Communication network 310 could be any network or collection of networks capable of operatively linking device 321, CPS 331, intended destination 351 and 341. Either all or a portion of communication network 310 could be owned or operated by a communications carrier, a virtual communications carrier, or the like. Customers could subscribe to or purchase communications services provided by the carrier, such as voice, video, or data services. Customers could be individuals, corporations, governments, or universities, as well as other types of entities that enter into a relationship with the carrier to obtain services provided by the carrier.

Device 321 could be any communication device capable of placing calls to communication network 310. For example, device 321 could be a mobile phone, a personal computer, a pager, or a personal digital assistant, as well as any other type of communication device or collection of communication devices. Intended destination 351 could be any network, system, or device capable of terminating or receiving calls from communication network 310. Similarly, hotline destination 341 could be any network, system, or device capable of terminating or otherwise receiving calls from communication network 310.

Call processing system 331 could be any system or collection of systems capable of processing call requests and/or otherwise providing call control for calls placed to or from device 321. Call processing system 131 could be owned or operated by a communications carrier, such as the same communications carrier or virtual carrier associated with all or a portion of communication network 310. Call processing systems, such as soft switches, media gateway controllers, circuit switches, and mobile switching centers, are generally well known in the art.

In operation, callers using devices, such as device 321, place calls to communication network 310. Call processing system 331 exchanges call signaling or control messages with the devices during the call process to initiate, setup, and teardown the calls. To initiate a call, a device typically transmits a call request message to call processing system 331. The call request message often times identifies the caller, such as by a device identifier or the like, and the called party, such as by a destination telephone number or other such called party identification. Call processing system 331 processes the call request message to determine call handling instructions or procedures for the call to route the call to the called party.

Call processing system 331 often times communicates with other call processing elements within communication network 310 to establish a call over communication network 310 to a destination. Call processing system 331 typically processes call requests using call processing tables stored in call processing databases to determine the call handling instructions or procedures for the calls. Call processing tables and databases, such as pre-translations, translations, and routing tables and/or databases are well known in the art.

In a call processing example, device 321 could transmit a call request to call processing system 331 for a call to intended destination 351. Intended destination 351 could be identified in the call request by a telephone number, a network address, a destination alias, or the like. Similarly, the calling party or device 321 itself could be identified in the call request, such as be a device identifier, a caller identifier, a network address, an alias, or the like.

In this example, call processing system 331 could receive and process the call request using call processing tables. In a first step, call processing system 331 could process the identity of the caller or calling device, device 321, to determine a customer profile associated with the caller or calling device by performing a look-up to a profile table using either the caller or device identity. Call processing system 331 could then retrieve the customer profile and apply settings or rules stored in the customer profile to the call request. In an example, customer profiles often times include well known limitations on what types of calls are allowed by a particular caller or device.

After determining that the call to intended destination 351 is allowed, call processing system 331 determines call handling or routing instructions for the call. In one example, call processing system performs a look-up to a call routing table to determine routing instructions for the call. Call processing system 331 could then return the call handling or routing instructions to device 321 and/or to elements within communication network 310 to continuing setting up the call between device 321 and intended destination 351.

It should be understood that additional call processing steps could be performed. It should be further understood that well known and widely understood variations of the call processing illustrated herein are possible.

In an advance, a communications carrier could provide interface system 325 between a customer of the communication carrier and call processing system 331. As illustrated in communication network 300, interface system 325 further includes customer interface system 324 and carrier interface system 326. Interface system 325 could provide the customer with the ability to modify the call processing steps executed by call processing system 331 when processing call request from callers or devices associated with the customer.

Carrier interface system 326 could be any system or collection of systems capable of providing an interface between communication carrier personnel and call processing system 331. In one example, carrier interface system 326 could be the Actiview™ Service Management system by Lucent Technologies.

Customer interface system 324 could be any system or collection of systems capable of providing an interface between carrier customers and carrier interface system 326, such as a web interface to a website. The website could be integrated with a customer profile database. A valid user could log into their account and/or account profile through the web interface. The web interface could display the account profile to the user. Included in the display could be a list of devices and/or callers potentially controllable through the web interface. For instance, a list of phone numbers associated with multiple devices could be displayed to the user for profile modification. The user could select which devices to hotline. The user could also select or otherwise determine or provide a hotline destination to which calls from the selected devices could be routed.

Optionally, the user could specify a number of calls that a hotline feature should be enabled for a particular device. For example, the user may wish that the hotline feature remain enabled for all calls from a particular device. Alternatively, the user may wish that only the first or next call from a particular device be enabled for the hotline feature. In yet another alternative, the user may wish that the device be enabled for the next several calls, such as two, three, or four calls. In yet another alternative, the user may desire to enable a hotline feature for a specified amount of time, a specified time of day, day of the week, or any combination thereof. At the time expiration, the hotline feature could be automatically disabled by customer interface system 324, carrier interface system 326, or call processing system 331.

In an embodiment, the web interface could display a quick-select option to the user that allows the user to, with a single input or selection, enable all the devices associated with the user and displayed to the user through the web interface. For example, if multiple devices are associated with the user, the user could be able to select with a single click or selection all of the devices, thereby enabling the hotline feature for each of the devices. In such a case, the single instruction would cause calls place from a first device to a first intended destination to be routed to the hotline destination. In addition, the single instruction would cause other calls from other devices to other intended destinations to be routed to the same hotline destination.

Upon receiving the hotline instructions or selections from the user, customer interface system 324 could then communicate with carrier interface system 326 to provision or otherwise enabled the instructions in call processing system 331. In one example, the customer account stored in or accessible by call processing system 331 could include an origination indicator field in a device or subscriber record associated with the customer. In addition, the customer account stored in or accessible by call processing system 331 could include an origination restriction digits field in the device or subscriber record associated with the customer. In a case whereby a hotline feature is enabled for a device or caller, the origination indicator field could be modified by carrier interface system 326 to indicate that the hotline feature is enabled. In addition, the origination restriction digits field could be modified by carrier interface system 326 to indicate the digits for the hotline destination. Clearing or disabling a hotline feature could be accomplished by changing the origination indicator value back to its original value and clearing the digits in the origination restriction digits field.

Continuing with an operational discussion, a communications carrier could provide customers of the carrier with the ability to hotline calls placed by callers or devices associated with the customers. In an example, calls placed to an intended destination would instead be routed to a hotline destination specified by the customers. The carrier could provide the customers with interface system 325 to transfer or input hotline instructions from the customers to call processing system 331. Interface system 325 could be a system or collection of systems that collect or otherwise received hotline instructions from the customers and transfer the hotline instructions in an appropriate manner to call processing system 331 for use in call processing.

It should be understood that the hotline instructions provided by carrier customers to call processing system 331 could be received and integrated into existing or new call processing tables. In one example, a processing table could store the identity of callers or devices in association with an entry or identifier that indicates whether or not a hotline instruction is enabled for that particular caller or calling device. Furthermore, the table could point to another entry in the same or another table identifying the hotline destination. The hotline destination could be identified by a telephone number, a network address, an alias, or the like. Other variations are possible.

In the event of a call from a device to an intended destination wherein a hotline instruction is enabled for the device or the caller, call processing system 331 would process the call to route the call to the hotline destination, rather than the intended destination. Presumably, the hotline destination could be a different destination than the intended destination. The hotline destination could be another device, such as a network, system, device, or any combination thereof, such as a mobile telephone, a landline telephone, an answering service, a messaging service, a personal computer, a personal digital assistant, a service platform, or the like.

Figure 4:
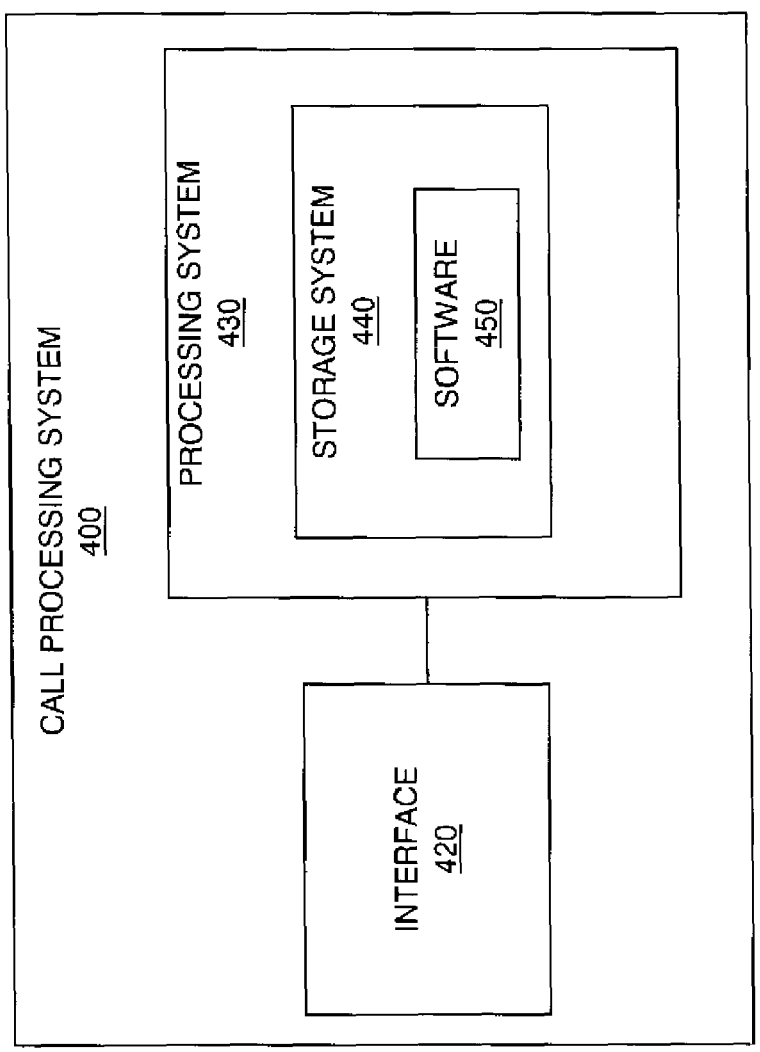
FIG. 4 illustrates a call processing system in an embodiment of the invention.

FIG. 4 illustrates call processing system 400 in an embodiment of the invention. Call processing system 400 could exemplify call processing system 331. Call processing system 400 includes interface 420, processing system 430, storage system 440, and software 450. Storage system 440 stores software 450. Processing system 430 is linked to interface 420. Call processing system 400 could be comprised of a programmed general-purpose computer, although those skilled in the art will appreciate that programmable or special purpose circuitry and equipment may be used. Call processing system 400 may use a client server architecture where operations are distributed among a server system and client devices that together comprise elements 420-450.

Interface 420 could comprise a network interface card, modem, port, or some other communication device. Interface 420 may be distributed among multiple communication devices. Interface 430 could comprise a computer microprocessor, logic circuit, or some other processing device. Processing system 430 may be distributed among multiple processing devices. Storage system 440 could comprise a disk, tape, integrated circuit, server, or some other memory device. Storage system 440 may be distributed among multiple memory devices.

Processing system 430 retrieves and executes software 450 from storage system 440. Software 450 may comprise an operating system, utilities, drivers, networking software, and other software typically loaded onto a general-purpose computer. Software 450 could also comprise an application program, firmware, or some other form of machine-readable processing instructions. When executed by the processing system 430, software 450 directs processing system 430 to operate as described for call processing system 331.

Figure 5:
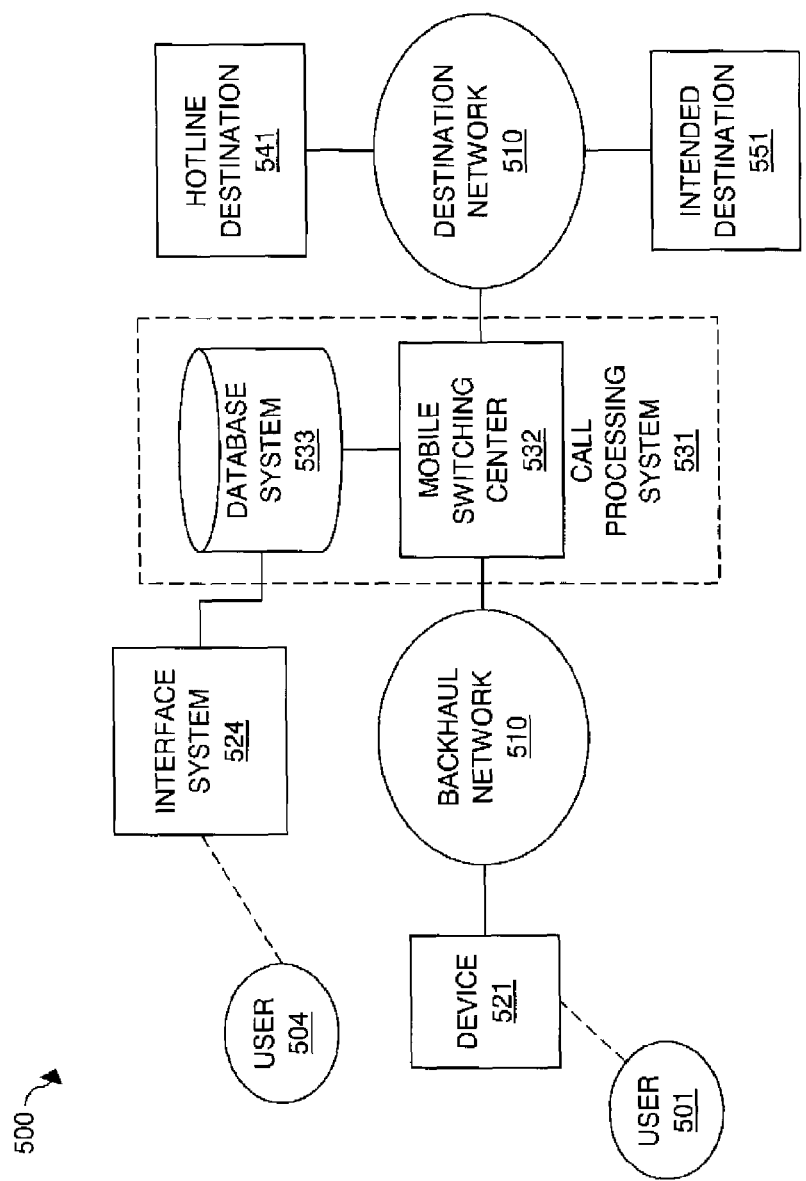
FIG. 5 illustrates a communication network in an embodiment of the invention.

FIG. 5 illustrates communication network 500 in an embodiment of the invention. Communication network 500 includes device 521, backhaul network 510, call processing system 531, destination network 510, hotline destination 541, and intended destination 551. Call processing system 531 includes mobile switching center 532 and database system 533.

Device 521 is operatively coupled to or in communication with call processing system 531 over backhaul network 510. Device 521 could communicate with backhaul network 510 over a wireless communication standard, such as GSM, TDMA, or CDMA, or any variation thereof.

Backhaul network 510 could be any network or collection of networks capable of transporting communications between device 521 and call processing system 531. Backhaul network 510 could comprise, for example, a T-1 connection, or a Gig-Ethernet link over a cable MSO network, as well as other types of backhaul links.

Destination network 510 could be any network or collection of networks capable of receiving calls from mobile switching center 532 and terminating calls to hotline destination 541 or intended destination 551.

Mobile switching center 531 could be any mobile switching center well known in the art. Database system 533 could be any database or collection of databases capable of interfacing to mobile switching center 531 and interface system 524. Database system 533 could store customer profiles, accounts, or records, or any combination thereof utilized by mobile switching center 531 for call processing purposes. Database system 533 could be considered a home location register (HLR), a visiting location register (VLR), or any combination thereof as is well known in the art. It should be understood that database system 533 could be a stand alone system. However, it should also be understood that database system 533 could be integrated with mobile switching center 532.

In operation, callers using devices, such as user 501 using device 521, place calls over backhaul network 510 to mobile switching center 532. Mobile switching center 532 exchanges call signaling or control messages with the devices during the call process to initiate, setup, and teardown the calls. To initiate a call, a device typically transmits a call request message to mobile switching center 532. The call request message often times identifies the caller, such as by a device identifier or the like, and the called party, such as by a destination telephone number or other such called party identification. Mobile switching center 532 processes the call request message to determine call handling instructions or procedures for the call to route the call to the called party.

Mobile switching center 532 often times communicates with other call processing elements within other communication networks, such as destination network 510, to establish a call to a destination. Mobile switching center 532 typically processes call requests using call processing tables stored in call processing databases, such as database system 533 or internal database, to determine the call handling instructions or procedures for the calls. Call processing tables and databases, such as pre-translations, translations, and routing tables and/or databases are well known in the art.

In a call processing example, device 521 could transmit a call request to mobile switching center 532 for a call to intended destination 541. Intended destination 541 could be identified in the call request by a telephone number, a network address, a destination alias, or the like. Similarly, the calling party or device 521 itself could be identified in the call request, such as be a device identifier, a caller identifier, a network address, an alias, or the like.

In this example, mobile switching center 532 could receive and process the call request using call processing tables. In a first step, mobile switching center 532 could process the identity of the caller or calling device, device 121, to determine a customer profile associated with the caller or calling device by performing a look-up to a profile table using either the caller or device identity. Mobile switching center 532 could then retrieve the customer profile and apply settings or rules stored in the customer profile to the call request. In an example, customer profiles often times include well known limitations on what types of calls are allowed by a particular caller or device.

After determining that the call to intended destination 541 is allowed, mobile switching center 532 determines call handling or routing instructions for the call. In one example, call processing system performs a look-up to a call routing table to determine routing instructions for the call. Mobile switching center 532 could then return the call handling or routing instructions to device 521 and/or internally process instruction in order to continue setting up the call between device 521 and intended destination 541.

It should be understood that additional call processing steps could be performed. It should be further understood that well known and widely understood variations of the call processing illustrated herein are possible.

In an advance, a communications carrier could provide interface system 524 between a customer of the communication carrier and call processing system 531, and in particular, to database system 533. The interface system 524 could provide the customer with the ability to modify the call processing steps executed by mobile switching center 532 when processing call request from callers or devices associated with the customer.

In particular, a communications carrier could provide customers of the carrier, such as user 504, with the ability to hotline calls placed by callers or devices associated the customers. In an example, calls placed to an intended destination would instead be routed to a hotline destination specified by the customers. The carrier could provide the customers with interface system 524 to transfer or input hotline instructions from the customers to database system 533. Interface system 524 could be a system or collection of systems that collect or otherwise receive hotline instructions from the customers and transfer the hotline instructions in an appropriate manner to database system 533 for use in call processing by mobile switching center 532.

It should be understood that the hotline instructions provided by carrier customers to database system 533 could be received and integrated into existing or new call processing tables. In one example, a processing table could store the identity of callers or devices in association with an entry or identifier that indicates whether or not a hotline instruction is enabled for that particular caller of calling device. Furthermore, the table could point to another entry in the same or another table identifying the hotline destination. The hotline destination could be identified by a telephone number, a network address, an alias, or the like. Other variations are possible.

In the event of a call from a device to an intended destination wherein a hotline instruction is enabled for the device or the caller, mobile switching center 532 would process the call to route the call to the hotline destination, rather than the intended destination. Presumably, the hotline destination could be a different destination than the intended destination. The hotline destination could be another device, such as a network, system, device, or any combination thereof, such as a mobile telephone, a landline telephone, an answering service, a messaging service, a personal computer, a personal digital assistant, a service platform, or the like.

Advantageously, communication network 500 allows a customer to provide hotline instructions that, when applied to a call, causes the call to be routed to a hotline destination, rather than the intended destination of the call. In an advantage, a party that wishes to communicate with another party in an urgent manner can provide a hotline instruction that causes a call by the other party to be routed according to the hotline instruction.

Those skilled in the art will appreciate variations from these embodiments that fall within the scope of the invention. Those skilled in the art will appreciate that the features described above can be combined in various ways to form multiple embodiments of the invention. As a result, the invention is not limited to the specific embodiments described above, but only by the claims and their equivalents.

What is claimed is:

1. A method of operating a call processing system to handle calls in a communication network operated by a communication carrier, the method comprising:
receiving a hotline instruction from a customer associated with a plurality of hotline destinations to enable a plurality of hotline features for a plurality of devices to route a plurality of calls from the plurality of devices to the plurality of hotline destinations, wherein the hotline instruction enables the plurality of hotline features for a predetermined number of calls and disables the plurality of hotline features after receiving the predetermined number of calls from each of the plurality of devices;
receiving a first call request for a first call to a first intended destination from a first device of the plurality of devices;
processing the first call request to determine if a first hotline feature for the first device is enabled; and
processing the first call request to route the first call to a first hotline destination of the plurality of hotline destinations instead of the first intended destination if the first hotline feature is enabled.

2. The method of claim 1 further comprising processing the first call request to route the first call to the first intended destination if the first hotline feature is not enabled.

3. The method of claim 1 further comprising receiving a second call request for a second call to a second intended destination from a second device of the plurality of devices;
processing the second call request to determine if a second hotline feature for the second device is enabled; and processing the second call request to route the second call to the first hotline destination instead of the second intended destination if the second hotline feature is enabled.

4. The method of claim 3 wherein the hotline instruction comprises a single hotline instruction and wherein the single hotline instruction enables the first hotline feature and the second hotline feature.

5. The method of claim 1 wherein the hotline instruction indicates a phone number for the first hotline destination.

6. The method of claim 1 wherein the hotline instruction enables the plurality of hotline features for a predetermined time of day.

7. The method of claim 1 wherein the call processing system comprises a mobile switching center.

8. The method of claim 1 wherein the first device comprises a first mobile phone, and wherein the first hotline destination comprises a second mobile phone.

9. The method of claim 8 wherein the hotline instruction is received from the customer over a website interface provided by the communication carrier.

10. A call processing system for handling calls in a communication network operated by a communication carrier, the call processing system comprising:
    an interface configured to receive a hotline instruction from a customer associated with a plurality of hotline destinations to enable a plurality of hotline features for a plurality of devices to route a plurality of calls from the plurality of devices to the plurality of hotline destinations, wherein the hotline instruction enables the plurality of hotline features for a predetermined number of calls and disables the plurality of hotline features after receiving the predetermined number of calls from each of the plurality of devices;
    the interface configured to receive a first call request for a first call to a first intended destination from a first device of the plurality of devices; and
    a processing system configured to process the first call request to determine if a first hotline feature for the first device is enabled, and process the first call request to route the first call to a first hotline destination of the plurality of hotline destinations instead of the first intended destination if the first hotline feature is enabled.

11. The call processing system of claim 10 wherein the processing system is further configured to process the first call request to route the first call to the first intended destination if the first hotline feature is not enabled.

12. The call processing system of claim 10 wherein the interface is further configured to receive a second call request for a second call to a second intended destination from a second device of the plurality of devices, and wherein the processing system is configured to process the second call request to determine if a second hotline feature for the second device is enabled and process the second call request to route the second call to the first hotline destination instead of the second intended destination if the second hotline feature is enabled.

13. The call processing system of claim 12 wherein the hotline instruction comprises a single hotline instruction and wherein the single hotline instruction enables the first hotline feature and the second hotline feature.

14. The call processing system of claim 10 wherein the hotline instruction indicates a phone number for the first hotline destination.

15. The call processing system of claim 10 wherein the hotline instruction enables the plurality of hotline features for a predetermined time of day.

16. The call processing system of claim 10 wherein wherein the call processing system comprises a mobile switching center.

17. The call processing system of claim 10 wherein the first device comprises a first mobile phone, and wherein the first hotline destination comprises a second mobile phone.

18. The call processing system of claim 17 wherein the hotline instruction is received from the customer over a website interface provided by the communication carrier.

19. A communication network operated by a communication carrier, the communication network comprising:
    an interface system provided by the communication carrier and configured to receive a hotline instruction from a customer associated with a plurality of hotline destinations to enable a plurality of hotline features for a plurality of devices to route a plurality of calls from the plurality of devices to the plurality of hotline destinations, and transfer the hotline instruction, wherein the hotline instruction enables the plurality of hotline features for a predetermined number of calls and disables the plurality of hotline features after receiving the predetermined number of calls from each of the plurality of devices; and
    a call processing system coupled to the interface system and configured to receive the hotline instruction, receiving a first call request for a first call to a first intended destination from a first device of the plurality of devices, process the first call request to determine if a first hotline feature for the first device is enabled, and process the first call request to route the first call to a first hotline destination of the plurality of hotline destinations instead of the first intended destination if the first hotline feature is enabled.

* * * * *